UNITED STATES PATENT OFFICE 2,576,486

ORGANOSILICON POLYESTERS

John Leopold Speier, Jr., Pittsburgh, Pa., assignor to Dow Corning Corporation, Midland, Mich., a corporation of Michigan No Drawing. Application February 2, 1950, Serial No. 142,079. In Canada May 13, 1949

12 Claims. (Cl. 260—75)

The present invention relates to organosilicon polyester resins.

The subject matter of the present application is disclosed and claimed in my copending application, Serial Number 37,052, filed July 3, 1948, now abandoned.

The organosilicon resins which are known in the art are siloxane resins. The linkages which constitute the major structure of such a resin are siloxane linkages, and with these resins polymerization is effected by the formation of siloxane linkages.

A principal object of the present invention is to provide a new and improved type of organosilicon resin and methods for the production thereof.

In accordance with the present invention a diacyl ester of a dihydric organosiloxane alcohol is employed in which the silicon atoms are linked together in a chain of alternating oxygen and silicon atoms, each silicon atom having two alkyl or aryl radicals bonded thereto and each terminal silicon atom also having bonded thereto one acyloxymethyl radical in which the acyl group is the acyl group of a monobasic monocarboxylic acid. The siloxane is reacted with a dicarboxylic acid whereby a polyester resin is produced.

The siloxanes employed in the method of the present invention are of the general formula $AcCH_2(R_2SiO)_nSiR_2CH_2Ac$. In the indicated formula Ac represents acyloxy, preferably acetoxy, R represents hydrocarbon radicals selected from the group consisting of alkyl and aryl radicals and $n$ is a positive integer.

Siloxanes of the above indicated type may be prepared by reacting a compound of the type $[ClCH_2R_2Si]_2O$ with a metal salt of a carboxy acid in the presence of a solvent for the salt. Thus, the siloxane may be reacted with potassium acetate in the presence of acetic acid as a solvent. By this method there is produced bis-(acyloxymethyl) tetraorganodisiloxane, for instance, bis(acetoxymethyl) tetramethyldisiloxane. These siloxanes and their method of production are disclosed and claimed in my copending application, Serial No. 36,813, filed July 2, 1948, now U. S. Patent No. 2,550,205. Compounds of this type are of the general formula indicated in which $n$ equals 1. Such a compound may be interacted with a diorganosiloxane to increase the chain length between the two silicon atoms thereof whereby to yield siloxanes of the general formula indicated in which $n$ is equal to an integer more than 1.

Well known dicarboxylic acids as are employed in the preparation of polyesters are suitable for the method of the present invention as for example, succinic, adipic, phthalic, malonic, and maleic acids.

During the course of interaction of the bis-(acyloxymethyl)siloxane and the dicarboxylic acid, the acyl radical is free from the siloxane in the form of the carboxy acid and may be removed by distillation preferably at reduced pressure.

The products of the present process are resins of the type known in the industry as polyester resins. Accordingly they may be employed for the uses for which polyester resins are used commercially, as for example, coating resins either in the form of varnish or pigmented to produce a paint or enamel. These resins are of greatly improved thermal stability, whereby the varnishes, paints and enamels are of particular utility for coating hot apparatus such as furnaces, stacks and the like.

Example 1

One half gram mol of bis(acetoxymethyl)-tetramethyldisiloxane was mixed with one half gram mol of succinic acid and heated at 150° to 170° C. A stream of carbon dioxide was blown through the mixture to aid in the removal of acetic acid. The reaction continued for about 6 hours after which the reaction mixture was cooled. A crystalline precipitate of succinic anhydride which formed during the heating, was removed by filtration. The filtered product was a light brown, viscous, resinous liquid which had an acid equivalent of 1214 and a saponification equivalent of 145. If desired, the resin so produced may be interacted with a polyhydric alcohol, such as pentaerythritol, or glycerin, in order to esterify the free carboxy acid radicals and thereby cross link the resin.

Example 2

One-third gram mol of the disiloxane employed in Example 1 was reacted with one half gram mol of adipic acid under the conditions stated in Example 1. The filtrate obtained upon removal of the adipic anhydride was a straw colored viscous liquid which had an acid equivalent of 431. Reaction of the product with glycerin by heating with sufficient glycerin to react with the free carboxy acid radicals at 200° C. for 3 hours increased the acid equivalent to 1245. The saponification equivalent was 160.

Example 3

Symmetrical bis(acetoxymethyl) dimethyldiphenyldisiloxane in amount of 20.1 grams was mixed with 7.3 grams of adipic acid and heated at 200° to 210° C. with a stream of dry nitrogen bubbling through it. Acetic acid was formed and was removed in the stream of nitrogen. The product was a very viscous resinous material of a light tan color.

That which is claimed is:

1. The method of preparing organosilicon polyesters which comprises interacting a dicarboxylic acid and a compound of the general formula $AcCH_2R_2SiOSiR_2CH_2Ac$ in which Ac represents acyloxy in which the acyl group is the acyl group of a monobasic monocarboxylic acid and R represents hydrocarbon radicals selected from the group consisting of alkyl and aryl radicals, and removing the carboxy acid formed during the course of the reaction.

2. The method of preparing organosilicon polyesters which comprises interacting a dicarboxylic acid and a diacyl ester of a dihydric organosiloxane alcohol in which the silicon atoms are linked together in a chain of alternating silicon and oxygen atoms, each silicon atom having two hydrocarbon radicals bonded thereto which hydrocarbon radicals are selected from the group consisting of alkyl and aryl radicals, and each terminal silicon atom also having bonded thereto one acyloxymethyl radical in which the acyl group is the acyl group of a monobasic monocarboxylic acid, and removing the carboxy acid formed as a result of said interaction.

3. The method of preparing organosilicon polyesters which comprises interacting a dicarboxylic acid and symmetrical bis(acetoxymethyl)tetramethyldisiloxane and removing the acetic acid formed during said interaction.

4. The method of preparing organosilicon polyesters which comprises interacting a dicarboxylic acid and symmetrical bis(acetoxymethyl)dimethyldiphenyldisiloxane and removing the acetic acid formed during said interaction.

5. The method of claim 1 in which the dicarboxylic acid is selected from the group consisting of succinic, adipic, phthalic, malonic, and maleic acids.

6. The method of preparing organosilicon polyesters which comprises interacting a dicarboxylic acid and a compound of the general formula $AcCH_2R_2SiOSiR_2CH_2Ac$ in which Ac represents an acetoxy radical and R represents hydrocarbon radicals selected from the group consisting of alkyl and aryl radicals, and removing the acetic acid formed during the course of the reaction.

7. The method of claim 2 in which the diacyl ester is a diacetyl ester.

8. An organosilicon polyester resin prepared in accordance with the method of claim 1.

9. An organosilicon polyester resin prepared in accordance with the method of claim 2.

10. An organosilicon polyester resin prepared in accordance with the method of claim 3.

11. An organosilicon polyester resin prepared in accordance with the method of claim 4.

12. An organosilicon polyester resin prepared in accordance with the method of claim 5.

JOHN LEOPOLD SPEIER, JR.

REFERENCES CITED

The following references are of record in the file of this patent:

Speier et al., Journ. Amer. Chem. Soc., vol. 71, April 1949, pp. 1474, 1475.